US007522922B2

(12) United States Patent
Koike

(10) Patent No.: US 7,522,922 B2
(45) Date of Patent: Apr. 21, 2009

(54) MOBILE COMMUNICATION TERMINAL, BASE STATION AND REGISTRATION CONTROL METHOD

(75) Inventor: Atsushi Koike, Yokohama (JP)

(73) Assignee: Casio Hitachi Mobile Communications Co., Ltd., Higashiyamato-Shi, Tokyo (JP)

( * ) Notice: Subject to any disclaimer, the term of this patent is extended or adjusted under 35 U.S.C. 154(b) by 385 days.

(21) Appl. No.: 11/316,250

(22) Filed: Dec. 21, 2005

(65) Prior Publication Data

US 2006/0141927 A1    Jun. 29, 2006

(30) Foreign Application Priority Data

Dec. 27, 2004    (JP) .............................. 2004-375376

(51) Int. Cl.
*H04W 36/00* (2009.01)

(52) U.S. Cl. ................ 455/435.1; 379/121.06

(58) Field of Classification Search .............. 455/435.1, 455/450

See application file for complete search history.

(56) References Cited

U.S. PATENT DOCUMENTS 6,141,535 A * 10/2000 Ayerst ....................... 340/7.25

2004/0162071 A1 * 8/2004 Grilli et al. ................ 455/435.1

FOREIGN PATENT DOCUMENTS

| CN | 1188366 | 7/1998 |
| CN | 1540920 | 10/2004 |
| JP | 2002-281152 | 9/2002 |
| WO | WO 2004/110037 A1 | 12/2004 |

OTHER PUBLICATIONS

Chinese Office Action (with an English translation) issued in the corresponding foreign application No. 2005-101381571.

* cited by examiner

*Primary Examiner*—Rafael Pérez-Gutiérrez
*Assistant Examiner*—Marcos Batista
(74) *Attorney, Agent, or Firm*—Cohen Pontani Lieberman & Pavane LLP

(57) ABSTRACT

A mobile communication terminal, base station and registration control method are capable of preemptively preventing congestion between a mobile communication terminal and a wireless base station distributing multicast content. The mobile communication terminal judges whether or not a restriction is applied (Step S12) or a partial restriction (partially restricted) is applied (Step S14) in a currently assigned frequency channel. When a restriction or partial restriction is applied, registration is not carried out. Meanwhile, when only a partial restriction is applied or when neither a restriction nor partial restriction is applied, a judgment is made as to whether or not the registration is authorized (Step S16). If authorization is given, registration is executed (Step S20) after a predetermined standby time (Step S18).

7 Claims, 8 Drawing Sheets

MOBILE COMMUNICATION TERMINAL, BASE STATION AND REGISTRATION CONTROL METHOD

CROSS-REFERENCE TO RELATED APPLICATION

This application is based upon and claims the benefit of priority from the prior Japanese Patent Application No. 2004-375376, filed Dec. 27, 2004, the entire contents of which is incorporated herein by reference.

BACKGROUND OF THE INVENTION

1. Field of the Invention

The present invention relates to a mobile communication terminal, base station and registration control method.

2. Description of the Related Art

With the proliferation of mobile telephones and increasing high performance, expectations are increasing to provide a wireless multicast service. Several specific methods have been proposed to provide a multicast service using mobile telephones.

A description is given hereafter of a general method for a mobile communication terminal to receive program broadcasts by a multicast service from a wireless base station. A wireless base station broadcasts programs using a specific frequency channel F. A mobile communication terminal assigned frequency channel F for communications with a wireless base station can receive program signals and receive programs by decoding program signals through a decryption means.

However, a mobile communication terminal assigned a frequency channel outside frequency channel F for communications with a wireless base station is unable to receive the program signals. A mobile communication terminal must undergo processing, called registration, with the wireless base station thereby changing the assigned frequency channel to F in order to receive the program signals. In this way, even a mobile communication terminal that has a different original frequency channel can receive program signals thereby enabling reception of a program by decoding the program signals through a decryption means. When completing the reception of the program, the corresponding mobile communication terminal can change the frequency channel back to the frequency channel prior to receiving the program by once again undergoing registration.

Meanwhile, technology has been proposed (reference is made, for example, to Japanese Laid Open Patent Publication 2002-281152) for preemptively preventing congestion when viewers/listeners attempt to connect at the same time to a specific connection address designated by the broadcast station for an audience to participate in a television or radio program.

However, with the technology disclosed in the above document, no consideration is given to a concentration of registrations to a frequency channel for wireless base stations when offering a wireless multicast service. For example, there is the problem that even if registrations are concentrated to a specific frequency channel for a wireless base station when a certain program is multicast from a wireless base station at the time of completing the program, there is no method to avoid congestion of the frequency channel where registrations have concentrated for each wireless base station.

SUMMARY OF THE INVENTION

The present invention has as its object to provide a mobile communication terminal, base station and registration control method capable of preemptively preventing congestion between a mobile communication terminal and a wireless base station distributing multicast content.

In order to achieve the above mentioned object, the mobile communication terminal according to the present invention is a mobile communication terminal which receives a program via a multicast sent from a wireless base station, comprises a communication means for communicating with a wireless base station, an acquisition means for acquiring registration control information to prohibit registration to a program via a multicast sent from the wireless base station, and a registration control means for controlling registration operation based on the registration control information.

Further, in order to achieve the above mentioned object, the mobile communication terminal according to the present invention comprises a communication means for communicating with a wireless base station, a registration means for performing by use of the communication means the registration operation to a program relative to a multicast sent from the wireless base station, and a standby means for waiting only a random wait time within a predetermined range prior to the start of the registration operation by the registration means.

Further, in order to achieve the above mentioned object, the base station according to the present invention is a base station for distributing a program by a multicast to a mobile communication terminal, comprises a control decision means for deciding whether or not the registration for a program by a multicast is restricted to the mobile communication terminal, and a restriction information transmission means for transmitting the registration control information including control information decided by the control decision means to the mobile communication terminal.

Further, in order to achieve the above object, the registration control method according to the present invention comprises the steps of, determining whether or not to restrict registration for programming by a multicast to the mobile communication terminal at a base station which distributes programs via a multicast to a mobile communication terminal, transmitting registration control information including determined registration control information to the mobile communication terminal, acquiring the registration control information from the base station by the mobile communication terminal prior to registration for programs according to the multicast, and controlling the registration operation of the mobile communication terminal based on the registration control information.

According to the present invention, the attained benefit is the ability to preemptively prevent congestion between a mobile communication terminal and a wireless base station with the distribution of multicast content.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

A. First Embodiment

A-1. Composition of the First Embodiment

Figure 1:
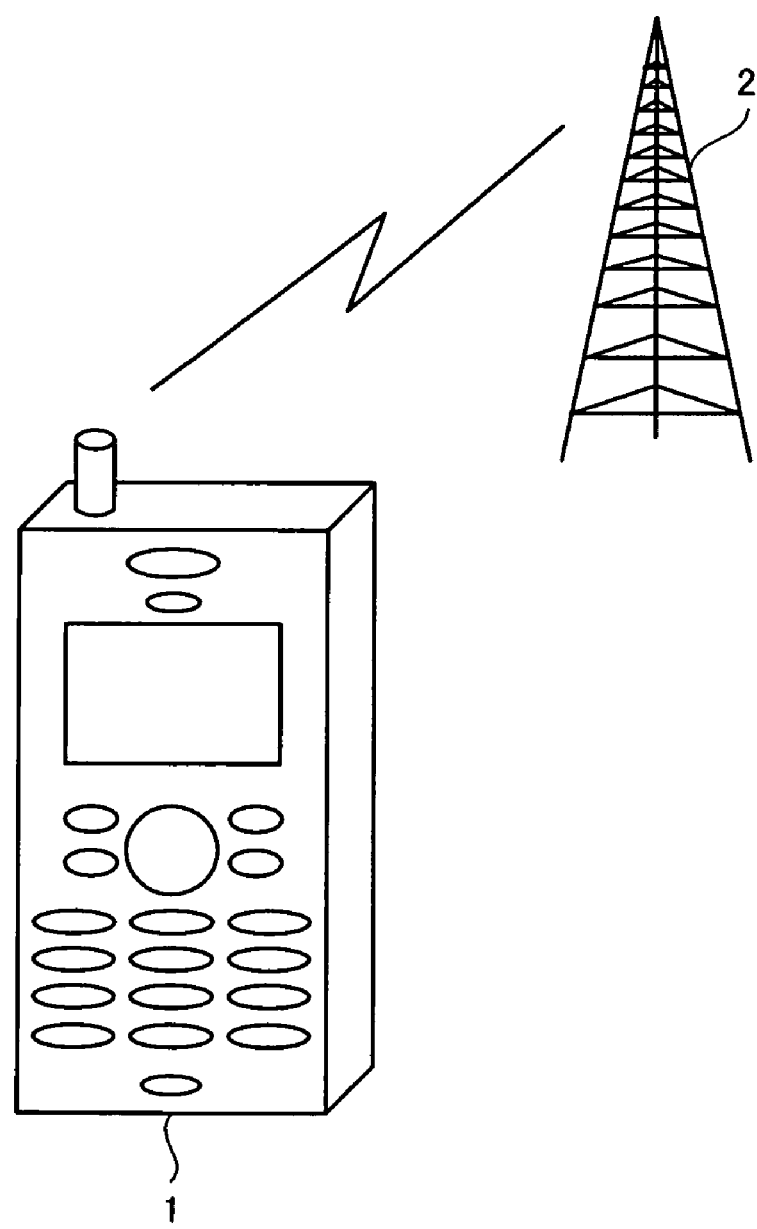
FIG. 1 is a block drawing that shows the construction of the multicast service system according to the first embodiment of the present invention.

FIG. 1 is a block drawing that shows the construction of the multicast service system according to the first embodiment of the present invention. In this drawing, the mobile communication terminal 1 communicates with the base station 2 through a frequency channel assigned by base station 2. Further, base station 2 assigns frequency channels to other mobile communication terminals (not shown in the drawing).

Figure 2:
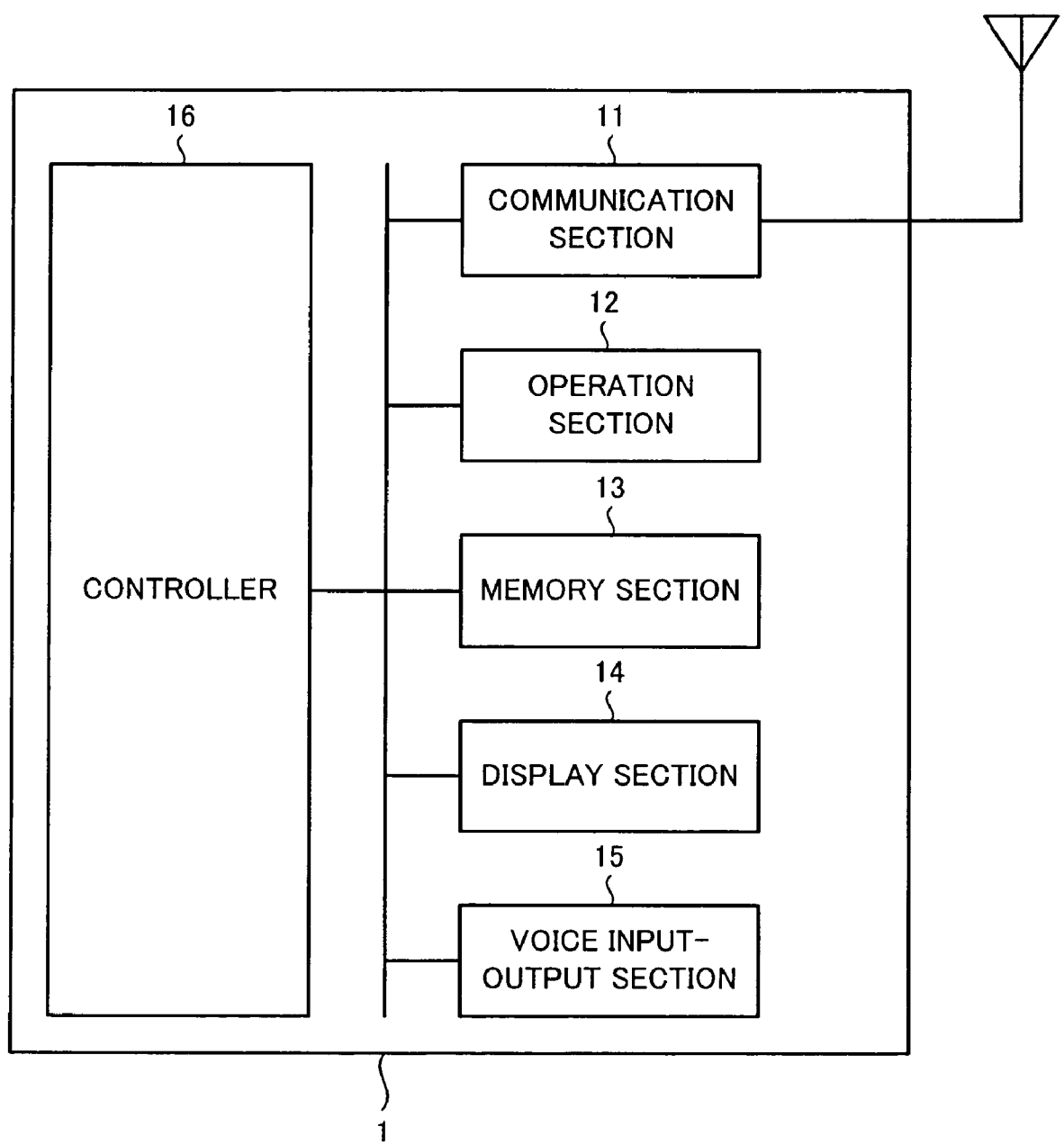
FIG. 2 is a block drawing that shows the construction of the mobile communication terminal 1 in the first embodiment.

Next, FIG. 2 is a block drawing that shows the construction of the mobile communication terminal 1 in the first embodiment. Mobile communication terminal 1 provides a communication section 11, an operation section 12, a memory section 13, a display section 14 and a voice input output section 15. The communication section 11 communicates with the base station 2. The operation section 12 receives input from the user into the mobile communication terminal 1 using the mobile communication terminal 1. Memory section 13 can be constituted of internal memory within the mobile communication terminal 1 and/or removable external memory. Memory section 13 also stores various program parameter values of the mobile communication terminal 1, user data, or the like.

Display section 14 is a display screen such as a liquid crystal display or the like which displays images of the received multicast content and the status of the mobile communication terminal 1. The voice input output section 15 provides a voice input output for converting the input voice into electronic signals and a voice output for outputting the voice. Control section 16 controls the communication section 11, operation section 12, memory section 13, display section 14 and voice input output section 15 based on a program stored in memory section 13.

Next, a description is given with reference to FIG. 3 of registration of the mobile communication terminal 1 at the time the program is multicast by a frequency channel different from the frequency channel assigned to the mobile communication terminal 1. Registration is a viewer registration performed by the mobile communication terminal at the time of initiating program reception. Through registration, the program is broadcast by a base station that is not broadcasting the program and mobile communication terminals assigned frequency channels different from the frequency channel on which the program is broadcast can be assigned the frequency channel for the program broadcast.

Figure 3A:
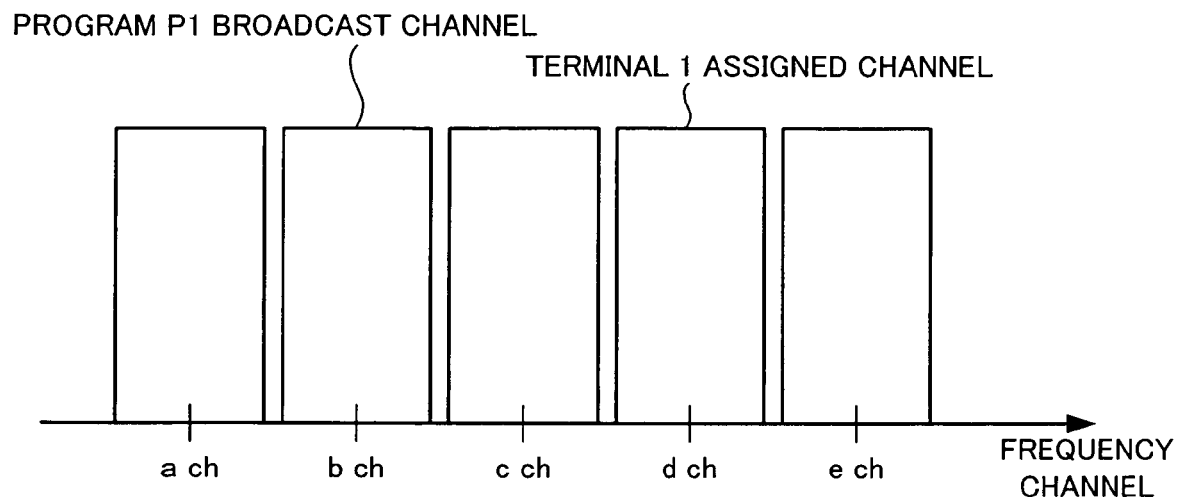
FIG. 3A and FIG. 3B are conceptual drawings that show an example of registration with the first embodiment.
Figure 3B:
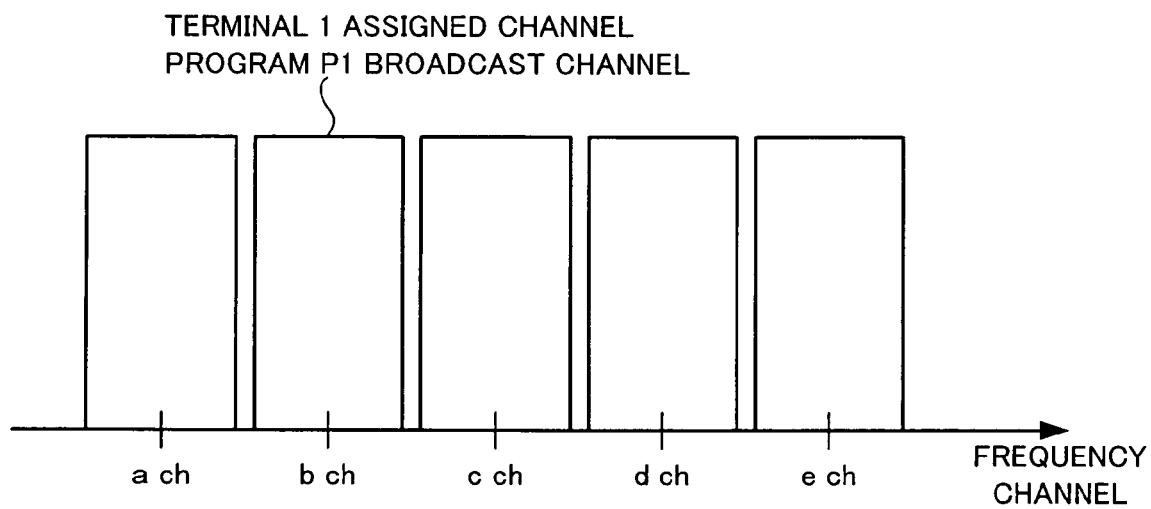

FIG. 3A shows the assignment of a frequency channel prior to performing registration. In FIG. 3A, the frequency channel assigned to mobile communication terminal 1 is channel d and the program P1 desired for viewing by the user using the mobile communication terminal 1 is broadcast using channel b. Since the broadcast channel of the Program P1 is different from the assigned channel to the mobile communication terminal 1, the mobile communication terminal 1 cannot receive the program P1. Therefore, when the mobile communication terminal 1 registers and changes the frequency channel assigned to the mobile communication terminal 1 from channel d to channel b, the mobile communication terminal 1 becomes capable of receiving the program P1. The assignment of the frequency channel at that time is shown in FIG. 3B.

When the mobile communication terminal 1 completes receiving the program P1, it changes the assigned frequency channel to channel d which is the frequency channel previous to receiving program P1 by performing another registration. In other words, the assignment of the frequency channel after completing reception of the program P1 returns to the state shown in FIG. 3A.

Figure 4:
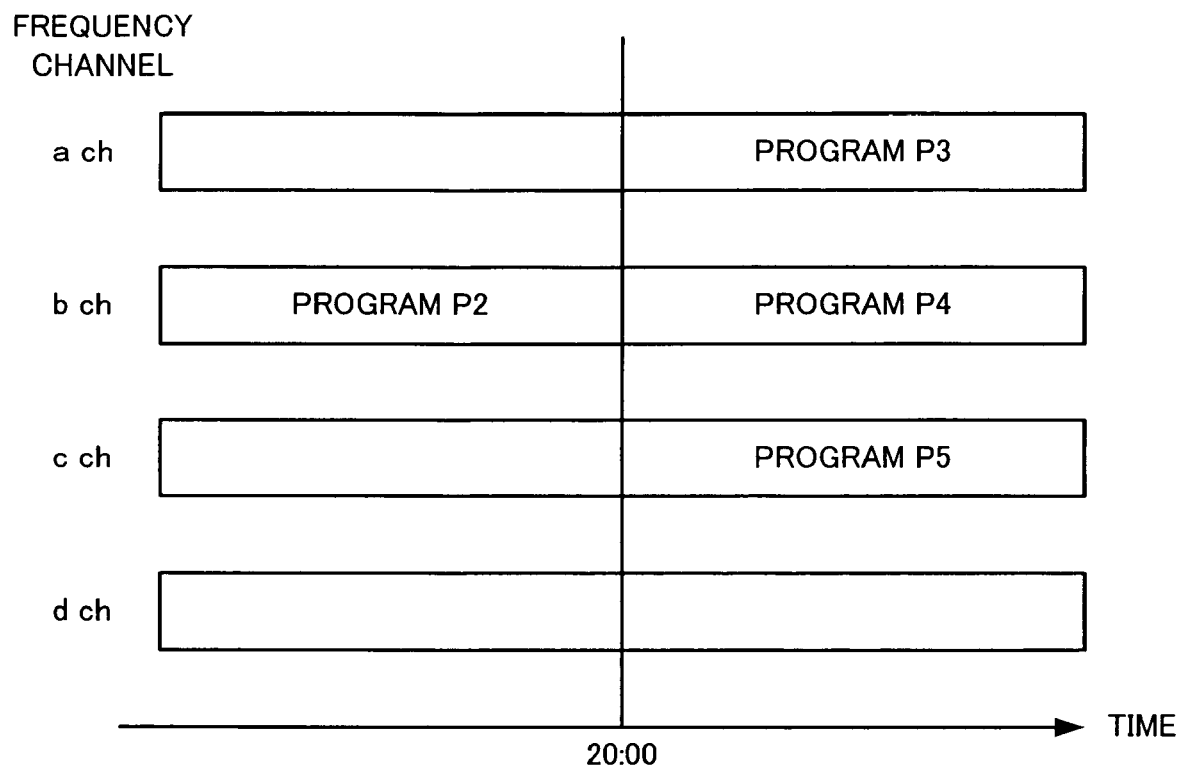
FIG. 4 is a conceptual drawing that shows an example of a broadcast program on each frequency channel in the first embodiment.

The concentration of registrations will hereinafter be described. Here, FIG. 4 is a conceptual drawing that shows the broadcast status of a program at 20:00 for a certain day on channels a, b, c, d. At this time, only those programs shown in FIG. 4 are broadcast. The mobile communication terminal 1 that satisfies the below conditions 1~4 can perform registration with channel b at 20:00.

(1) The assigned frequency channel at the time of not receiving the program is a channel other than channel b and it will receive program P2 till 20:00 but will not receive any other program after 20:00.

(2) The assigned frequency channel at the time of not receiving the program is a channel other than channel b and it will receive program P2 at 20:00 and will receive program P3 or program P5 after 20:00.

(3) The assigned frequency channel at the time of not receiving the program is channel b and no program is received at 20:00 but will receive program P3 or program P5 after 20:00.

(4) The assigned frequency channel at the time of not receiving the program is channel b and it will receive program P2 at 20:00 and will receive program P3 or program P5 after 20:00.

There is the possibility that congestion will be generated for channel b as mobile communication terminals that satisfy the above conditions 1~4 register to channel b at once at 20:00. A structure is therefore required to avoid that. Therefore, with the first embodiment, the generation of congestion can be avoided on a frequency channel by applying a control to the registration of the mobile communication terminals.

A-2. Operation of the First Embodiment

Figure 5:
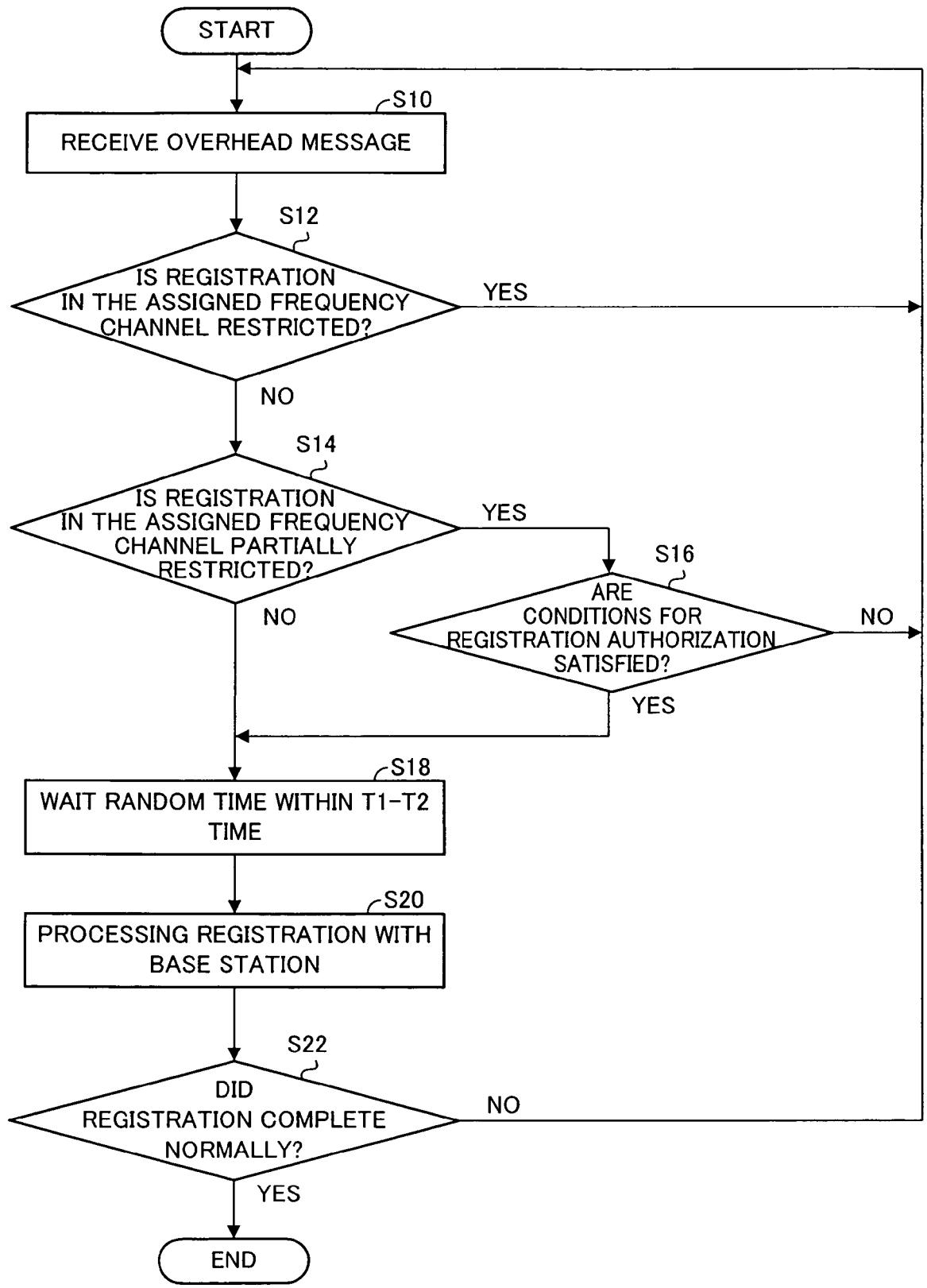
FIG. 5 is a flow chart for explaining the process flow for registration of the mobile communication terminal 1 according to the first embodiment.

The operation of the mobile communication terminal 1 according to the first embodiment described above will hereinafter be described. Here, FIG. 5 is a flow chart for explaining the process flow for registration of the mobile communication terminal 1 according to the first embodiment. When beginning registration by the mobile communication terminal 1, the control section 16 receives an overhead message from the base station through the communication section 11 (Step S10). At this time, a message may be displayed to the display section 14 that indicates testing in an attempt to receive the program. Moreover, effective sound or music may also be output from the voice input output section 15 to indicate testing in an attempt to receive the program.

Next, the control section 16 judges from the content of the received overhead message whether registration restrictions are applied or not to the currently assigned frequency channel (Step S12). Further, if restrictions are applied, there is a return to Step S10 and the reception of the overhead message is repeated.

In other words, if restrictions are applied, registration is prohibited for all mobile communication terminals assigned that frequency channel. Moreover, when restrictions are applied, a message may be displayed by the display section 14 indicating that restrictions are applied. In addition, effective sound, music or the like may be output from the voice input output section 15 indicating that restrictions are applied. Further, a request to cancel the reception of the program may also be received from the operation section 12.

On the other hand, if restrictions are not applied, the control section 16 judges from the content of the received overhead message whether partial restriction of registration applies or not to the frequency channel currently assigned (Step S14). Furthermore, when partial restrictions apply, the control section 16 judges from the parameter values of the mobile communication terminal 1 stored in memory section 13 and from the contents of the received overhead message whether the mobile communication terminal 1 has authorization for registration or not (Step S16). Here, if registration is not authorized as a result of a judgment, there is a return to Step S10 and the reception of the overhead message is repeated.

In other words, when a partial restriction is applied, registration is prohibited to a portion of the mobile communication terminals assigned that frequency channel. For example, a method can be considered in which upon completion of the program reception, a mobile communication terminal attempting to register in order to change the assigned frequency channel to the frequency channel prior to receiving the program becomes subject to registration prohibition. Further, a method can also be considered for making a determination according to the telephone number. Further, a method can also be considered for having parameters for determining the registration priorities for each mobile communication terminal and a determination can be made according to these parameters.

Moreover, when a partial restriction applies, a message may be displayed by the display section 14 that indicates the application of a partial restriction. Further, effective sound, music or the like can also be output to the voice input output section 15 to indicate the application of a partial restriction. Further, a request to cancel the reception of the program may also be received from the operation section 12.

Meanwhile, when partial restrictions do not apply or when conditions for registration authorization are satisfied for that to which partial restrictions apply, the control section 16 first determines the times T1, T2 consisting of positive real numbers and creates a random number from within the values of time T1 to time T2, and waits only for that time (Step S18).

Time T1 is the minimum value of the standby time until the next process and time T2 is the maximum value of the standby time until the next process. Time T1 and time T2 make up a function of T1≦T2. Further, at a time when no standby time is necessary until the next process, T1=T2=0 is used. Time T1, T2 may always be a fixed value and can be calculated from the content of the overhead message or parameter value of mobile communication terminal 1 stored in memory section 13. For example, a method can be considered where time T1 and T2 are quite short when initiating reception of the program but have no reception of the program until this time.

After completing standby, the control section 16 performs communication for registration processing with the base station 2 through the communication part 11 (Step S20). Next, control section 16 judges whether the registration processing with the base station 2 has completed normally or not (Step S22). Further, when completed normally, the corresponding processing is completed. Moreover, when completed normally, a message may be displayed on the display section 14 indicating that normal completion has occurred. In addition, effective sound, music or the like may also be output to the voice input output section 15 indicating that normal completion has occurred.

On the other hand, at such times when there are poor reception conditions of electromagnetic waves during the registration process, registration processing will not complete normally. When, in this manner, the registration process does not complete normally, there is a return to Step S10 and the above process is repeated.

Figure 6:
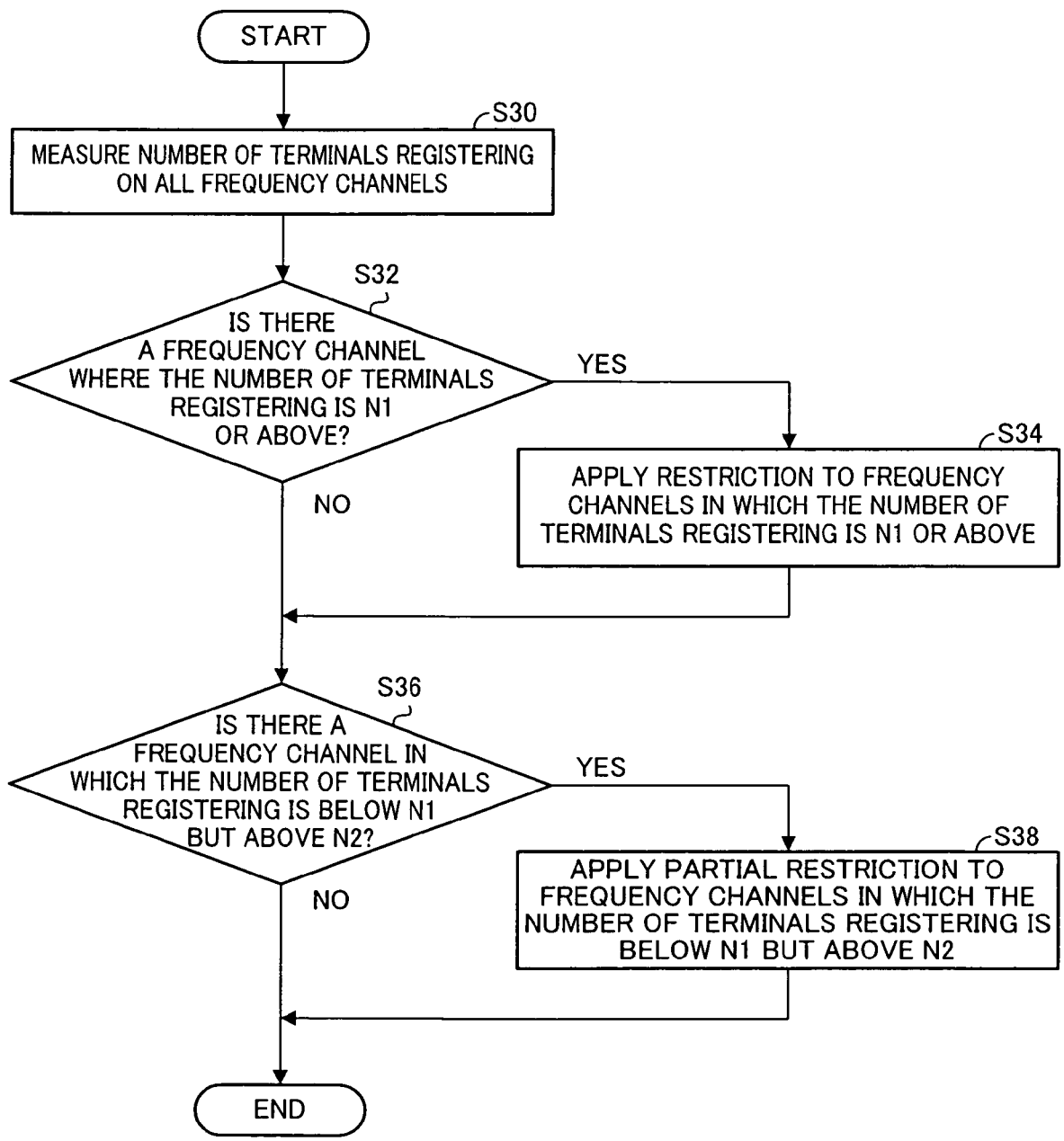
FIG. 6 is a flow chart for explaining the process flow for applying control of registration by the base station 2 according to the first embodiment.

The operation of the base station 2 according to the first embodiment described above will hereafter be described. Here, FIG. 6 is a flowchart for explaining the process flow that applies to registration restrictions by the base station 2 according to the first embodiment. When the base station 2 initiates processing for restricting registration, base station 2 measures the number of mobile communication terminals registering for all frequency channels (Step S30).

Next, the base station 2 judges whether there are frequency channels where the number of registering mobile communication terminals are a restriction count N1 or above for restriction (Step S32). Further, if there is a frequency channel in which the number of registering mobile communication terminals are N1 or above, the base station 2 applies a restriction to the frequency channel in which the number of registering mobile communication terminals is N1 or above (Step S34).

Meanwhile, if the number of registering mobile communication terminals is not N1 or above, or after applying a restriction to the frequency channel that is N1 or above in Step S34, the base station 2 judges whether there is a frequency channel of less than N1 (Step S36). N2 is regulated to be the same or a smaller value than N1.

If there is a corresponding frequency channel, the base station 2 applies a partial restriction to the frequency channel in which the number of registering mobile communication terminals is less than N1 but greater than N2 (Step 38), by which the corresponding process is completed. However, if there is none, the corresponding process is completed without a partial restriction.

According to the first embodiment described above, congestion can be preemptively prevented between a mobile communication terminal and a wireless base station when distributing multicast content because a restriction is applied to a frequency channel in which the number of registering mobile communication terminals is N1 or above when there is a frequency channel in which the number of registering mobile communication terminals is a restriction count N1 or above, while a partial restriction is applied to the frequency channel in which the number of registering mobile communication terminals is less than N1 but greater than N2 when there is a frequency channel in which the number of registering mobile communication terminals is a restriction count of less than N1 but N2 or above for partial restrictions at the base station 2.

B. Second Embodiment

The second embodiment of the present invention is explained hereafter. In the second embodiment, the base station 2 is characterized by applying the restriction at a different timing from the first embodiment. In the first embodiment described above, the base station 2 applies the restriction according to the number of the mobile communication terminals during the registration. However, the first embodiment does not take into consideration the pre-application of a partial restriction at the time of starting or ending a program. Accordingly, the second embodiment considers the pre-application of partial restriction at the time of starting or ending a program.

Figure 7:
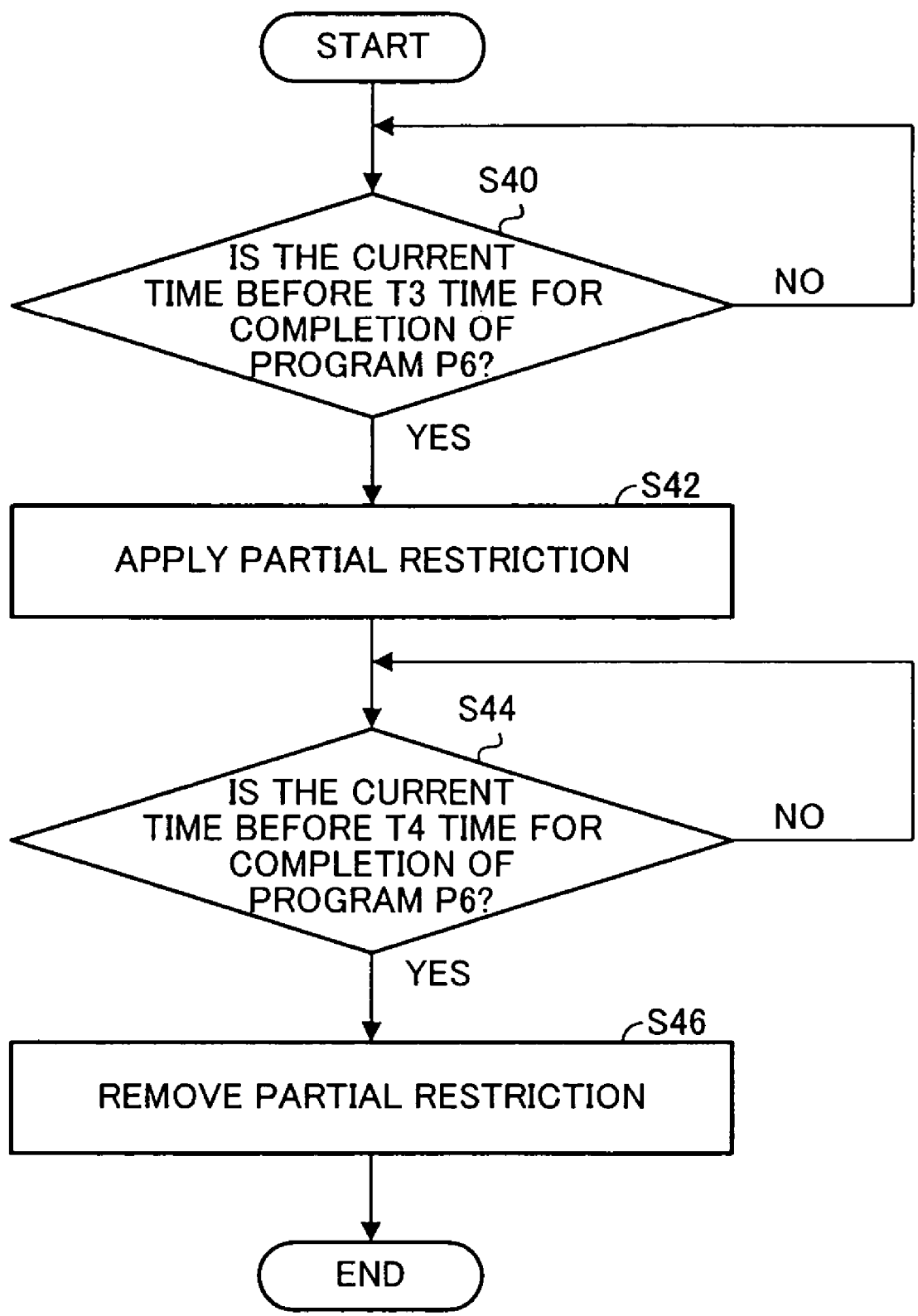
FIG. 7 is a flow chart for explaining the process of applying control of registration by the base station 2 in the second embodiment of the present invention.

FIG. 7 is a flowchart for describing a process where the base station 2 applies a restriction for the registration according to the second embodiment. When a plurality of programs is broadcast on one frequency channel, the flowchart shown in FIG. 7 is executed for every program. FIG. 7 considers the case where program P6 is broadcast by frequency channel f.

When the broadcasting of program P6 is started, the base station 2 judges whether or not the current time is prior to time T3 before the end of the program (Step S40). When the current time is prior to time T3 before the end of the program, the base station 2 applies a partial restriction to the frequency channel f (Step S42). The partial restriction may be applied to only those mobile communication terminals which receive the program P6. On the other hand, when the current time is not before the end of the program time T3, the base station 2 stands by while repeating the Step S40 until reaching the time T3. In addition, the time T3 is pre-fixed at the base station 2.

Next, the base station 2 judges whether or not the current time is after the end of the program time T4 (Step S44) and if the time is after the end of the program time T4, the base station 2 removes the partial restriction (Step S46) for the frequency channel f performed in Step S42.

However, in the state when the partial restriction should not be removed in other programs broadcasting via frequency channel f, the base station 2 does not remove the partial restriction. On the other hand, when the current time is not after the end of the program time T4, the base station 2 stands by while repeating the Step S44 until after the time T4. In addition, time T4 is pre-fixed at the base station 2.

According to the second embodiment described above, congestion can be preemptively prevented between a mobile communication terminal and a wireless base station when distributing multicast content because a partial restriction is pre-applied at the time of starting and ending the program.

C. Third Embodiment

The third embodiment of the present invention is explained hereafter. The third embodiment is different from the aforementioned first embodiment and second embodiment in that the base station 2 does not apply a restriction to the mobile communication terminal 1. The mobile communication terminal 1 waits only a random time when undergoing registration. By so doing, the third embodiment is characterized by the fact that the congestion of the frequency channel can be prevented without changing the structure of the base station which is different from the first embodiment and second embodiment.

Figure 8:
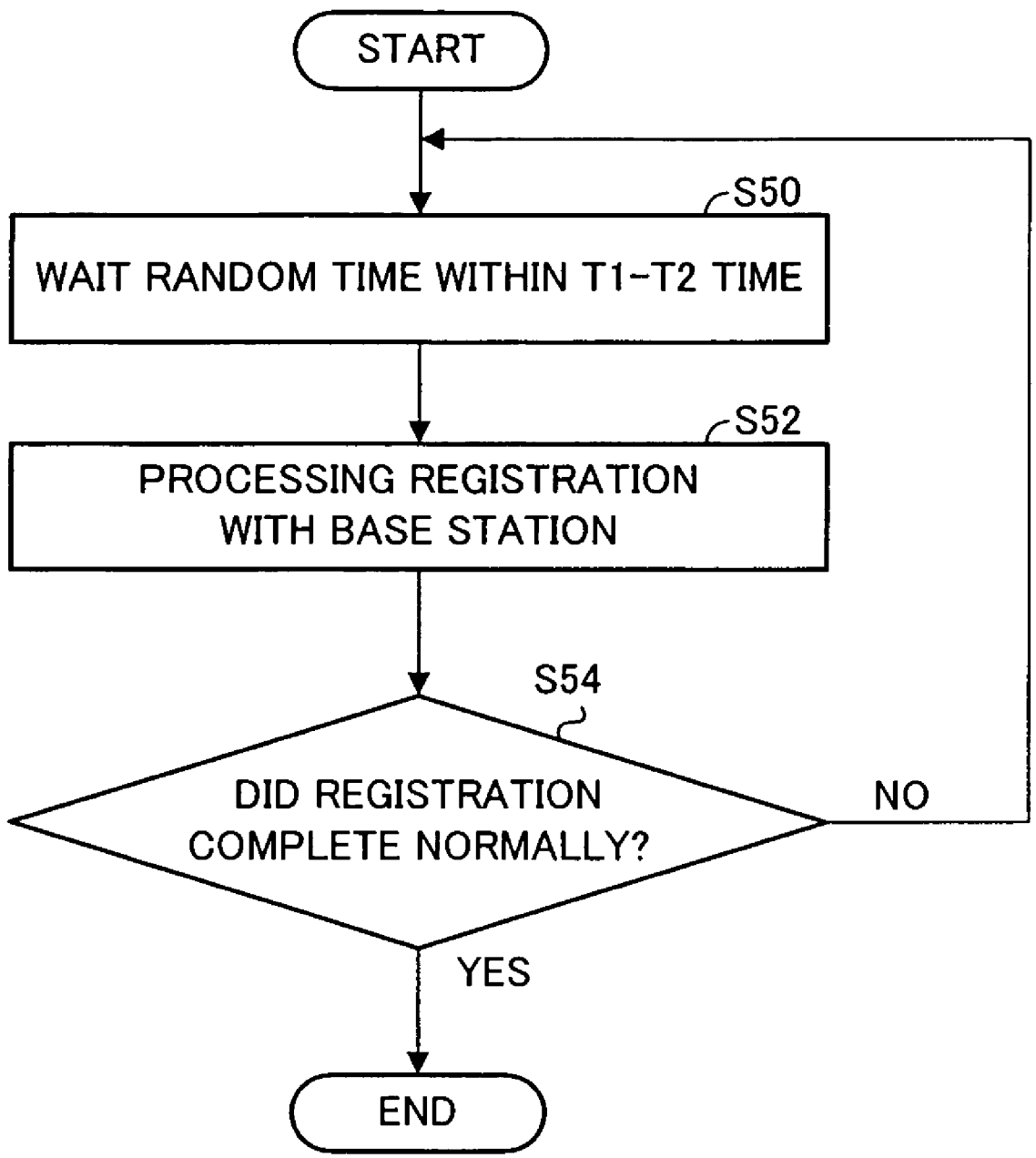
FIG. 8 is a flow chart for explaining the process of registration of the mobile communication terminal 1 in the third embodiment of the present invention.

FIG. 8 is a flowchart to explain the registration process of the mobile communication terminal 1 in the third embodiment. When the mobile communication terminal 1 starts registration, the control section 16 first determines times T1, T2 consisting of positive real numbers, creates a random number from within the values of time T1 to time T2 and waits only that time (Step S50).

Time T1 is the minimum value of the standby time until the next process and time T2 is the maximum value of the standby time until the next process. Time T1 and time T2 make up a function of $T1 \leq T2$. Further, at a time when no standby time is necessary until the next process, $T1=T2=0$ is used. Time T1, T2 may be always a fixed value or can be computed from the parameter value of the mobile communication terminal 1 stored in memory section 13 and from the content of the overhead message. For example, a method can be considered where time T1 and T2 are quite short when initiating reception of the program but have had no reception of the program until this time.

After completing standby, the control section 16 performs communication for registration processing with the base station 2 through the communication part 11 (Step S52). Next, control section 16 judges whether the registration processing with the base station 2 has completed normally or not (Step S54). Further, when the registration process is completed normally, the corresponding processing is completed. At this time, a message may be displayed to the display section 14 indicating that normal completion. In addition, effective sound, music or the like may also be output to the voice input output 15 indicating that normal completion has occurred.

On the other hand, at such times when there are poor reception conditions of electromagnetic waves during the registration process, since registration processing will not complete normally, there is a return to Step S50 and the above process is repeated until the registration process completes normally.

According to the preferred third embodiment described above, the generation of congestion for the frequency channel can be prevented without changing the structure of the base station and also without applying a restriction to the mobile communication terminal 1 because the standby time is only random timing when registration is performed by the mobile communication terminal 1.

In addition, any one of the first through third embodiments can be implemented even when the base station 2 has only one assigned frequency for a multicast. Further, the first through third embodiments can be used in combination.

While the present invention has been described with reference to the preferred embodiments, it is our intention that the invention be not limited by any of the details of description thereof.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are intended to be embraced by the claims.

What is claimed is:

1. A mobile communication terminal which receives a program via a multicast sent from a wireless base station, comprising:
   a communication means for communicating with the wireless base station;
   an acquisition means for acquiring registration control information in order to prohibit registration to a program via a multicast sent from a wireless base station using the communication means;
   a registration control means for controlling the registration operation based on the registration control information;
   wherein the registration control means cancels the registration operation and prevents the mobile communication terminal from switching from an original frequency channel to a frequency channel on which the program is transmitted when the registration control information indicates that registration is prohibited for all mobile communication terminals and thereby prevents the mobile communication terminal from receiving the program; and
   wherein the registration control means cancels the registration operation and prevents the mobile communication terminal from switching from the frequency channel on which the program was transmitted back to the original frequency channel when the registration control information indicates that registration is prohibited for a portion of all mobile communication terminals.

2. The mobile communication terminal according to claim 1, further comprises a condition judgment means for judging whether or not the terminal satisfies the predetermined conditions in order to register when the registration control information indicates that registration is prohibited for a portion of the mobile communication terminals,
   the registration control means executes the registration operation when the condition judgment means judges that the terminal satisfies the predetermined conditions.

3. The mobile communication terminal according to claim 2, wherein the registration control means stands by for a random waiting time within the predetermined range before the registration operation starts.

4. A base station for distributing a program by a multicast to one or more mobile communication terminals, comprising:
   a control decision means for determining whether or not registration for a program by a multicast is restricted to the one or more mobile communication terminals; and
   a restriction information transmission means for transmitting the registration control information including control information determined by the control decision means to the one or more mobile communication terminals;
   wherein the control decision means prohibits registration to all of the one or more mobile communication terminals which communicate with the base station and attempts to switch from an original frequency channel to a frequency channel on which the program is transmitted; and
   wherein the control decision means prohibits registration to a portion of the one or more mobile communication terminals which communicate with the base station and attempts to switch from the frequency channel on which the program was transmitted back to the original frequency channel.

5. A registration control method comprising the steps of:
   determining whether or not to restrict registration for programming by a multicast to one ore more mobile communication terminals at a base station which distributes programs via a multicast;
   transmitting registration control information including determined registration control information to the one ore more mobile communication terminals;
   acquiring the registration control information from the base station by the one or more mobile communication terminals prior to registration for programs according to the multicast; and
   controlling the registration operation of the one or more mobile communication terminals based on the registration control information by:
   applying a complete restriction, which cancels the registration operation and prevents the one or more mobile communication terminals from switching from an original frequency channel to a frequency channel on which the program is transmitted when the registration control information indicates that registration is prohibited for all mobile communication terminals, to thereby prevent the one or more mobile communication terminals from receiving the program, and
   applying a partial restriction, which cancels the registration operation and prevents the one or more mobile communication terminals from switching from the frequency channel on which the program was transmitted back to the original frequency channel when the registration control information indicates that registration is prohibited for a portion of all mobile communication terminals, to thereby prevent the one or more mobile communication terminals from switching back to the original frequency channel.

6. The registration control method according to claim 5, further includes the steps of:
   determining whether or not the one or more mobile communication terminals satisfies the predetermined conditions in order to achieve registration when the registration control information indicates a partial restriction; and
   executing the registration operation when it is determined that the one or more mobile communication terminals satisfies the predetermined conditions.

7. The registration control method according to claim 6, further includes the step of:
   executing a random standby waiting time within the predetermined range by the one or more mobile communication terminals before the registration operation is started.

* * * * *